Jan. 31, 1956 J. W. PARKS 2,732,652
FISHING LEADER
Filed Jan. 4, 1952

INVENTOR.
Joseph W. Parks.
BY Douglas R. Scott
HIS ATTORNEY

United States Patent Office 2,732,652
Patented Jan. 31, 1956

2,732,652

FISHING LEADER

Joseph W. Parks, Altoona, Pa.

Application January 4, 1952, Serial No. 264,879

1 Claim. (Cl. 43—44.83)

This invention relates to fishing leaders and a principal object of this invention is the provision of new and improved devices of this type.

When a fish hook is swallowed by a fish, it is often impossible to remove the hook without fatally injuring the fish. However, if the hook is left in the fish and the fish is returned to its natural habitat, its chances of survival are excellent. Accordingly, conservation authorities have long advocated that sportsmen make no attempt to remove the hook from undersized fish, but merely return them to the water after cutting their leader leaving the hook in the fish. Since leaders are relatively expensive, fisherman have been reluctant to cut their leaders and usually attempt to retrieve their hook before returning the fish to the water. It is an object of this invention to provide a fishing leader which may be detached from a hook without damage to the leader.

Another object of this invention is the provision of a fishing leader which may be detached from a fish hook by manipulation of the leader at a distance from the fish hook.

Another object of this invention is to provide a fishing leader which may be easily and quickly attached to a fish hook.

Another object of this invention is the provision of a fish hook which may be easily and quickly attached to a leader.

Other objects and advantages will become apparent from the following specification taken in connection with the accompanying drawings wherein.

Figure 1:
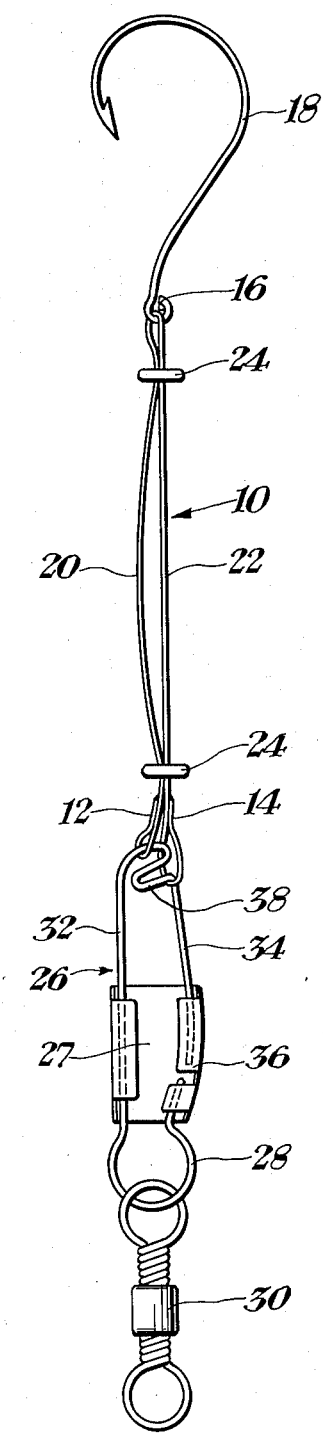
Fig. 1 is a view of a fish hook with a leader attached thereto and embodying my invention.

Referring more particularly to the drawings, the leader is here shown as comprising a filamentous member designated generally by a reference numeral 10. The filamentous member 10 may be formed of any suitable material but is preferably a strong ductile metal such as tungsten. The filamentous member 10 is provided with a loop 12 on one end and a loop 14 on the other end. The loops 12, 14 may be formed by folding the end portions of the member 10 upon themselves and securing such end portions to the bight of the member 10 by welding or the like. The junctions of the end portions of the member 10 with the bight thereof are made as small as possible for a purpose which will more fully appear hereafter.

The filamentous member 10 is threaded through the eye 16 of a fish hook 18 and is folded upon itself so that the loops 12, 14 and bight portions 20, 22 thereof are juxtaposed each to the other. A plurality (here shown as two) of resilient elements 24 of annular form encompass the bight portions 20, 22 of the filamentous member 10 and serve to maintain the same contiguous each to the other.

Means is provided for securing a fishing line (not shown) to the loops 12, 14 and is here shown as a clip or snap fastener 26. The clip 26 may be of any suitable form and is here shown as comprising a body portion 27 of sheet metal or the like having a ring 28 secured to one end thereof for connection to the usual swivel 30 to which the fishing line may be attached. A generally U-shaped member extends from the other end of the body portion 27 and has one leg 32 securely fastened thereto. The other leg 34 of the U-shaped member releasably engages a keeper 36 formed on the body portion 27. The legs 32, 34 of the U-shaped member have an inherent resilience so that the leg 34 is urged into engagement with the keeper 36 in a manner well known in the art.

Formed on the leg 34 of the clip 26 is an offset portion 38 which extends toward the leg 32, the extremity of the offset portion 38 being located adjacent the leg 32.

Figure 2:
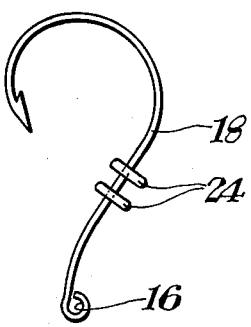
Fig. 2 is a view of a fish hook particularly adapted for use with a leader embodying this invention.
Figure 3:
Fig. 3 is an enlarged sectional view of a detail.

In assembling the device, the leg 34 of the clip 26 is disengaged from the keeper 36. The loop 12 is passed over the leg 34 and forced between the leg 32 and the offset portion 38 to the position shown in Fig. 1. The annular elements 24 are placed on the shank of the hook 18 as shown in Fig. 2 and the loop 14 is threaded through the eye 16 of the fish hook 18. The filamentous member 10 is then folded upon itself and the loop 14 passed over the leg 34 of the clip 26 to the position shown in Fig. 1. The leg 34 of the clip 26 is then reengaged with the keeper 36 to prevent removal of the loop 14 therefrom. The annular elements 24 are then moved downward, as viewed in the drawings, along the shank of the fish hook 18, over the eye 16 and onto the folded filamentous member 10 where they are positioned in spaced relation each to the other and serve to hold the bight portions 20, 22 of the filamentous member 10 tightly together. The leader is now ready for use.

In the event that the fish hook 18 is swallowed by a fish and it is desired to leave the hook in the fish, the leg 34 of the clip 26 is disengaged from the keeper 36 and the loop 14 removed therefrom. A pull on the clip 26 will then cause the filamentous member 10 to run through the eye of the fish hook 18, the resilient annular elements 24 yielding to permit the loop 14 to pass therethrough and the loop 14 passing through the eye 16 of the fish hook 18. The leader may thus be salvaged while leaving the hook in the fish and another fish hook may be applied thereto in the manner hereinbefore set forth.

It will be apparent that with this invention a single leader may be used with a plurality of hooks and, since fish hooks are relatively inexpensive, the sportsman will be encouraged to leave the hook in the fish thereby furthering the ends of conservation through the prevention of needless fatalities among smaller fish.

It will also be apparent that a fish hook having the resilient annular elements 24 carried on the shank thereof is easily and quickly applied to the leader of this invention.

It will also be apparent to those skilled in the art that many changes may be made in the details of construction and arrangement of parts without departing from the scope of the invention as defined in the appended claim.

It is claimed and desired to secure by Letters Patent:

In combination with a fish hook having an eye formed therein, a filamentous member threaded through said eye and folded upon itself, one end portion of said member being folded upon itself and secured to said member immediately adjacent said one end portion to define a first loop, the other end portion of said member being folded upon itself and secured to said member immediately adjacent said other end portion to define a second loop in juxtaposed relation with said first loop, and at least one ring of elastic material encircling said folded member and normally holding contiguous parts thereof snugly together.

References Cited in the file of this patent

UNITED STATES PATENTS

| | | |
|---|---|---|
| 295,212 | Van Wagener | Mar. 18, 1884 |
| 622,206 | Claflin | Apr. 4, 1899 |
| 1,501,953 | Leslie | July 22, 1924 |
| 1,551,829 | Maxwell | Sept. 1, 1925 |
| 2,150,074 | McLure | Mar. 7, 1939 |
| 2,162,739 | Mindex, Jr. | June 20, 1939 |
| 2,172,510 | Jaccard | Sept. 12, 1939 |
| 2,463,116 | Lewis | Mar. 1, 1949 |
| 2,561,144 | Seaton | July 17, 1951 |
| 2,572,889 | Strykower | Oct. 30, 1951 |